July 22, 1969   J. M. SNYDER   3,456,346
CIRCLE CUTTER AND PROTECTIVE COVER
Filed Oct. 20, 1966   2 Sheets-Sheet 1

INVENTOR.
JOHN M. SNYDER
BY Edward Halle
ATTORNEY.

July 22, 1969          J. M. SNYDER          3,456,346

CIRCLE CUTTER AND PROTECTIVE COVER

Filed Oct. 20, 1966          2 Sheets-Sheet 2

INVENTOR.
JOHN M. SNYDER

BY *Edward Halle*

ATTORNEY.

United States Patent Office 3,456,346
Patented July 22, 1969

3,456,346
CIRCLE CUTTER AND PROTECTIVE COVER
John M. Snyder, New York, N.Y., assignor to Commercial Carpet Corporation, New York, N.Y., a corporation of New York
Filed Oct. 20, 1966, Ser. No. 588,087
Int. Cl. B26b 3/08, 3/06
U.S. Cl. 30—310               2 Claims

ABSTRACT OF THE DISCLOSURE

This disclosure relates to a circle cutter in a novel form provided in a circular body construction having finger gripping means disposed at the top thereof within the body construction, and having the cutting means and circle centering means at the bottom thereof adapted to the fitted into a removable protective cover contiguous with said body portion of said cutter. When the body portion of the cutter is fitted into the protective covering, the cutter will have a neat, compact appearance, will be in condition for easy and safe storage, and the blade of the cutter will be protected from damage as well as being rendered safe and harmless. When the body portion of the cutter is removed from the protective cover, the special finger gripping means within it comprising indentations in its upper surface will serve to permit the user to use the tool efficiently and surely.

---

Further advantages of the novel construction of my invention will appear in the specification hereinbelow and in the drawings in which.

Similar numerals refer to similar parts throughout the several views.

Figure 1:
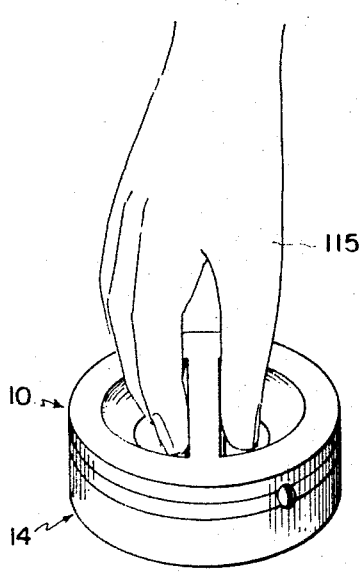
FIG. 1 is a perspective view of my circle cutter with its protective covering in position.

The circle cutter is made of any suitable material which can be formed, molded or fashioned into the desired constructional shape. In the preferred form of the invention, I prefer to use my suitable high impact plastic which can be molded in the shapes shown in the drawings.

The circle cutter comprises a main body portion 10 which itself comprises a top portion 12 and a bottom portion 14. The top portion 12 has finger gripping means such as indentations 16 in the top surface 18 of body portion 10. The indentations or recessed portions 16 are arranged so that a substantially central finger gripping member 20 is formed between recessed portions 16; thus providing walls 22 which may be gripped between the thumb and fingers of the operator's hand. The bottom portion 14 of the body portion 10 of the cutter is provided with a slit 26 through which blade 30 may be positioned. There is also side wall means 32 and 34 in both the upper and lower portions of the body portion 10. There is an upper shoulder 36 and a lower shoulder 38 in the upper and lower edges of side wall portion 34. These shoulders are provided so that the side wall means 32 of the upper portion may be fitted around the shoulder for attaching the upper portion of the body portion to the lower portion of the body portion. This attachment may be maintained permanently when the cutter is put together by providing a suitable plastic bonding agent.

The lower annular shoulder 38 is provided so that the protective cover or closure portion 40 may be friction slide fitted to be removably connected to body portion 10 at its upper side wall 42. Side wall 34 in lower portion 14 of the body portion 10 of the cutter comprises blade holding means 44 which are positioned above slit 26. The blade holding means 44 comprise a pair of spaced facing inwardly projecting arms 46 having end stop means 48. The facing arms 46 act as a guide for the upper portion 50 of blade 30, and the blade is held in position by means of a set screw 52 and a nut 54. Set screw 52 is provided with an opening 56 in side wall means 34 and blade 30 is also provided with an opening 58 and a slot 60 so that blade 30 can be positioned around the screw 52 and between the nut 54 and blade platform 64 positioned on the inner side of wall 34. I prefer to use a Tinnerman nut as this may be made to fit between arms 46 in the same manner as blade 30.

Thus, when blade 30 is positioned through slit 26 and the set screw 52 is tightened against nut 54, the blade will be firmly held in position and because of slot 60, the blade may be adjusted to different heights by loosening and tightening set screw 52 and moving blade 30 either up or down before refastening the set screw.

Figure 2:
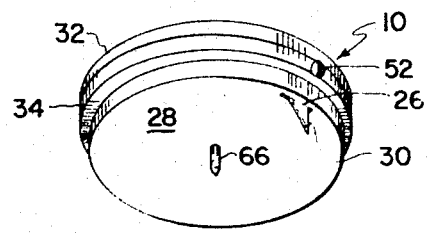
FIG. 2 is a perspective view of the body portion of my circle cutter with the protective covering removed showing the bottom thereof with the centering and cutting elements.
Figure 3:
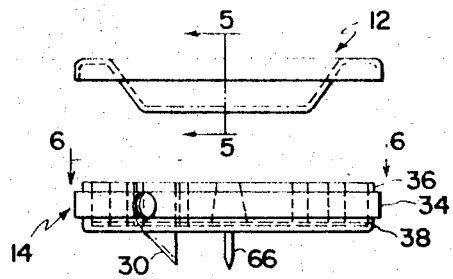
FIG. 3 is an exploded elevational view showing the top and bottom portions of the main body portion of the cutter and the protective cover portion with portions of the view cut away and portions in medial cross section.
Figure 4:
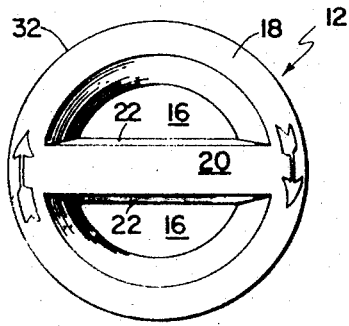
FIG. 4 is a top plan view of the cutter.
Figure 5:
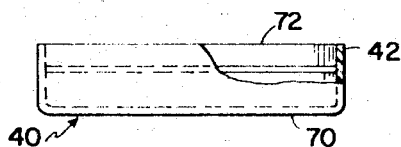
FIG. 5 is a sectional view taken along the lines 5—5 in FIG. 3.
Figure 6:
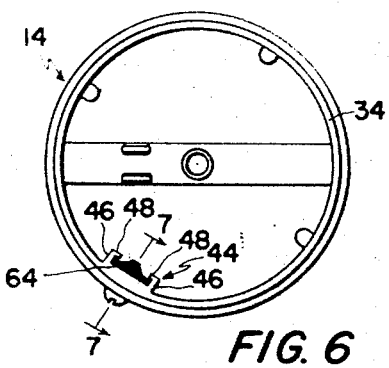
FIG. 6 is a top plan view taken along the lines 6—6 in FIG. 3.
Figure 7:
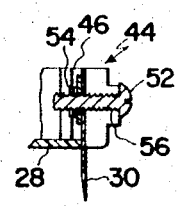
FIG. 7 is a detail sectional view taken along the lines 7—7 in FIG. 6.
Figure 8:
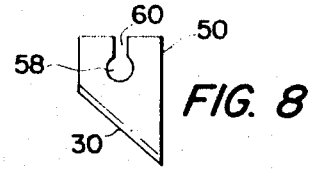
FIG. 8 is an elevational view of a blade as used in the invention.
Figure 9:
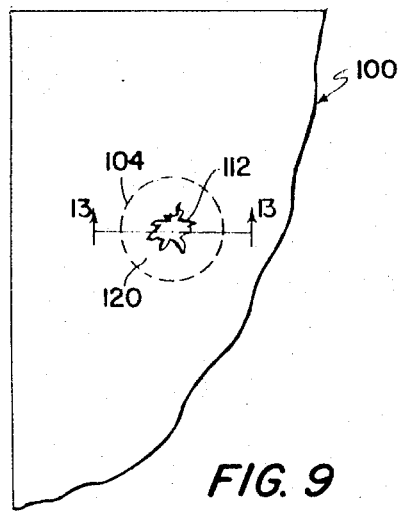
FIG. 9 is a representation in top plan of a piece of laid carpet with portions cut away showing a burnt portion having been burnt by a cigarette, with a circle dotted around the burnt portion.
Figure 11:
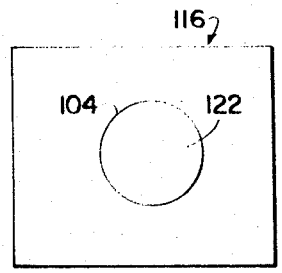
FIG. 11 is a top plan view of another portion of carpet with a circle cut having been made therein before the circular cut portion has been removed.
Figure 12:
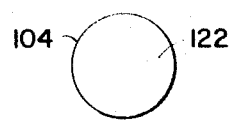
FIG. 12 is a top plan view of a new portion of carpet such as a circular piece cut from FIG. 11 which may be used to replace the damaged circular portion of the carpet such as is shown in FIG. 10.
Figure 10:
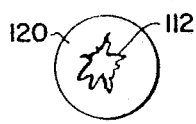
FIG. 10 is a top plan view of a portion of carpet such as a circular piece cut from FIG. 9 containing the damaged portion of carpet.
Figure 13:
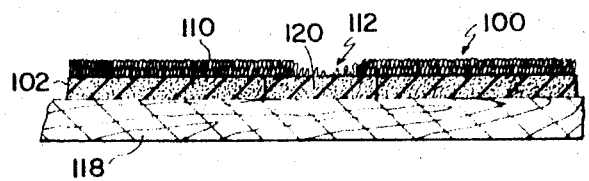
FIG. 13 is a sectional view along the lines 13—13 in FIG. 9 showing the carpet with the circular cut made around the burnt portion.
Figure 14:
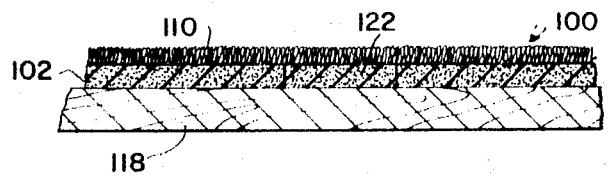
FIG. 14 is a sectional view similar to FIG. 13 showing the damaged portion of the carpet removed with the new portion of the carpet such as shown in FIG. 12 in place.
Figure 15:
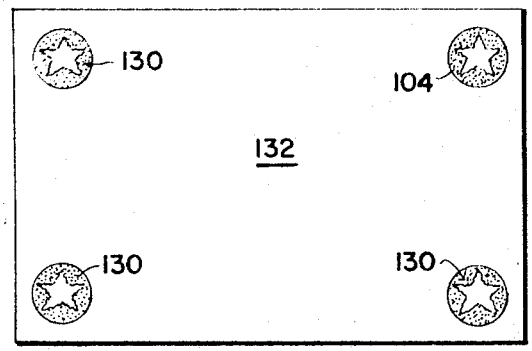
FIG. 15 shows a top plan representation of a carpet having four circular cutout inserts containing star designs cut with the tool of the invention and inserted to provide a contrasting design.

I also provide centering means such as a centering pin 66 which is firmly set at a central portion in the bottom 28. Thus, when the blade 30 and the centering pin 66 are fixed into the tool and the tool body portion 10 is completely assembled as shown in FIG. 2 of the drawings, the operator may grip member 20 between his thumb and forefingers and place the cutter on an object to be cut, for example, a piece of carpeting having a sponge base, and then twisting the cutter in the direction of the arrow as shown in FIG. 4 of the drawings to cut out a perfect circle of the carpeting material. Another circle similarly cut from another piece of carpeting may then be substituted for the first circle enabling the user of the tool to form excellent repair patches for carpeting or good circular design elements to be placed at different points in a piece of carpet.

The use of the tool in connection with repairing carpeting or placing designs in carpeting is as follows:

When a pile carpet 100 having a sponge backing or base 102 and a multi-filament nylon pile portion 110 has been damaged by a cigarette burn 112 or other destructive medium, it may be repaired. The damaged section of carpet may be cut out and a new section put in which may be adhesively secured at the sponge backing or base. The first step is to select a piece of identical carpet 116 to that damaged from which a circle may be cut. The tool is then grasped in the hand 115 of the user, the centering pin 66 is placed at the center of the damaged portion of the rug or carpet and a circle 104 is cut by twisting the tool in a clockwise direction As a part of this process, the knife edge must be adjusted so that it will come out far enough from bottom 28 to cut through the sponge backing 102 of the carpet, and yet not too far so that it will cut through or into the floor 118 on which the carpet is lying. The circle is then cut around the damaged portion of the carpet and the circular damaged portion of carpet 102 is removed. A corresponding circle 122 is cut from the new piece of carpet 116. Thus, a new circle of carpet of the exact size of the damaged circular portion will be obtained.

Adhesives well known to the art are then applied to the sponge backing material forming the hole in the carpet lying on the floor and also to the circumference of the sponge backing material of the new circular section, and if desired, to the floor and to the back of the new circular section. The new circular section is then placed in its proper position in the hole of the old carpet and the adhesive is permitted to set thereby effecting a repair by the method of the invention.

The identical method of the invention may be used to supply a decorative portion 130, such as a star design, to an otherwise plain carpet 132 by cutting out circles in the plain carpet and replacing them with circles 130 from a carpet having a design, such as the star, or contrasting color, or both, or any other design. In addition, letters of the alphabet to form initials, or a message or legend of some kind can be placed into carpets by the method of the invention. As a matter of fact, any contrasting arrangement may be designed into an existing carpet installation by the method of the invention.

I illustrate the use of the tool for explanation only. The tool may also be used for cutting any circular piece of material or for creating a circle cut in any suitable material within the size limitations of the tool.

The closure portion 40 has side wall means 42 which may be friction titted onto shoulder 38 and has a bottom 70. Its upper portion 72 is open. The height of wall 42 should be sufficiently high so that centering pin 66 and blade 30 will fit within it when it is fitted as a closure to cover the bottom 28 of body portion 10.

While I have described my cutter and closure cover in their preferred form, there are other forms which they may take without departing from the spirit and scope of the invention. For example, I have illustrated the cutter as a tool having a circular shape with circular side wall means. The shape of the body portion may, of course, be changed without departing from the spirit and scope of the invention since the tool may be square with four side walls rather than circular with one side wall means. I, therefore, desire to be protected for all forms coming within the claims hereinbelow.

Therefore I claim:

1. A circle cutter comprising a blade holding body portion and a cover portion in which said blade holding body portion is substantially circular and relatively flat having a bottom, a side wall and a top, said bottom comprising a center pin, said side wall comprising a blade holder adapted to hold a blade substantially parallel to and in offset relationship to said side wall, and said top comprising finger grip recess means, said blade holding body portion having means to receive said closure portion; said closure portion having a circular wall of a height at least as high as the length of the said centering pin or the length of said cutting blade, whichever extends to the greater length from the bottom portion of the blade holding body portion, said closure means portion having means adapted to fit said fitting means of said body portion and having an open top and a closed bottom.

2. The circle cutter as defined in claim 1, having adjustable blade holding means.

References Cited

UNITED STATES PATENTS

| 79,181 | 6/1868 | Andrews | 30—310 |
|---|---|---|---|
| 925,278 | 6/1909 | Bickford | 30—151 |
| 2,463,024 | 3/1949 | Del Monte et al. | 30—310 |
| 2,913,140 | 11/1959 | Vuillemenot | 220—94 |

JAMES L. JONES, JR., Primary Examiner

U.S. Cl. X.R.

30—151